Patented Apr. 12, 1949

2,467,169

UNITED STATES PATENT OFFICE 2,467,169

HIGH DIELECTRIC MATERIAL AND METHOD OF MAKING SAME

Eugene Wainer, Niagara Falls, N. Y., assignor, by mesne assignments, to National Lead Company, New York, N. Y., a corporation of New Jersey No Drawing. Application November 12, 1942, Serial No. 465,387

3 Claims. (Cl. 106—39)

The present invention relates to ceramic dielectric materials and methods of making the same. More particularly, the invention comprises ceramic dielectric materials in which the major constituents are certain divalent salts of titanic acid.

The use of compounds of titanium in the production of dielectric materials is known but according to the prior art it has been generally believed that most desirable electrical characteristics are achieved in the case of compositions having an excess of titanium dioxide. According to the present invention it is found that manifold higher dielectric constants are attainable by forming ceramic dielectric bodies wherein there is substantially no free titanium dioxide and wherein a mixture of titanates of more than one metal is employed.

In no case the dielectric characteristics of the ceramic materials of the present invention be approached or approximated by a mixture of a titanate with $TiO_2$, or by a single titanate alone, or by a mixture of titanates plus material quantities of $TiO_2$. The controlling factors in the formation of the present bodies are the presence of more than one titanate and the substantial absence of free rutile, $TiO_2$, in the final product.

The precise reason for the surprising dielectric results attained by mixtures of more than one titanate, as compared with bodies comprising single titanates, is not definitely and certainly known, but it has been found that peak dielectric constants of various mixtures of titanates are found to occur when the combined titanates have a definite gram-molecular ratio, of which more will appear later herein.

Titanium dioxide ceramic dielectric bodies are a relatively recent development and those thus far known generally have dielectric constants in the neighborhood of 100. Some of the mixtures of titanates prepared in accordance with the present invention have dielectric constants between 3000 and 4000 and dielectric constants of 1000 are commonly encountered.

While various titanates may be mixed interchangeably to produce ceramic dielectric bodies, according to the present invention, the titanates of barium, strontium and lead are found to yield surprising results.

The novel compositions of the present invention consist of fired mixtures of prefired titanates prepared by combining any of the foregoing oxides with titanium dioxide. In all cases the titanates are not to contain $TiO_2$ in amounts exceeding fifty gram-molecular per cent. For the various compositions set forth in the ensuing examples the percentages by weight of $TiO_2$ are from 25 to 45 per cent with 35 to 40 per cent by weight of $TiO_2$ preferred. It is, however, the stated gram-molecular percentage which is important, because of the desire to produce the titanate substantially free of crystalline rutile and with titanium oxide present only in combination with the other titanate-forming oxide. To further this result it is better in some cases to have in the batch of mixed titanates before firing a slight excess of one of the constituents which react with rutile to form titanates, so that the fired batch has definitely less than fifty gram-molecular per cent of $TiO_2$.

As examples of the high dielectric ceramic compositions of the foregoing general discussion, reference will now be had to certain groups of mixtures of titanates, the groups referred to by way of example comprising mixtures of titanates selected from among barium titanate, strontium titanate, and lead titanate.

*Group I.*—Mixtures of $SrTiO_3$ and $BaTiO_3$ wherein the $SrTiO_3$ is in any proportion between 5% and 95% by weight with the $BaTiO_3$ assuming corresponding complementary proportion from 95% to 5% by weight.

*Group II.*—Mixtures as in Group I but with up to 10 molal per cent of either SrO or BaO or a mixture of the two added to the raw batch before firing.

*Group III.*—Mixtures of $BaTiO_3$ and $PbTiO_3$ wherein the $BaTiO_3$ is in any proportion between 20% and 95% by weight with the $PbTiO_3$ varying correspondingly from 80% to 5% by weight.

*Group IV.*—Mixtures as in Group III with up to 10 molal per cent of BaO added to the raw batch before firing.

*Group V.*—Mixtures of $SrTiO_3$ and $PbTiO_3$ wherein the $SrTiO_3$ is in any proportion between 20% and 95% by weight with the $PbTiO_3$ varying correspondingly from 80% to 5% by weight.

*Group VI.*—Mixtures as in Group V with up to 10 molal per cent of SrO added to the raw batch before firing.

Group VII.—Mixtures of $SrTiO_3$, $BaTiO_3$ and $PbTiO_3$. In this group the $PbTiO_3$ constituent need not exceed 20% by weight and as low as 20% by weight is useful. The percentages by weight of the $SrTiO_3$ and the $BaTiO_3$ may vary so that they are present in the same range of ratios as in Group I.

Group VIII.—Mixtures as in Group VII but with up to 10 molal per cent of either SrO or BaO or a mixture of the two added to the raw batch before firing.

The bodies are prepared by the addition of water and are fired to vitrification temperatures by conventional methods. Some of the dielectric bodies of the foregoing groups are subject to cracking while being fired. It has been found that small amounts of borates, borosilicates, or boron titanate avoids this danger and gives the bodies proper firing characteristics without materially altering the desired electrical properties.

The following tabulations give the electrical characteristics of bodies of the various foregoing group definitions. In each case the materials are mixed as the preferred powder, water is added and the bodies are pressed to shape in steel molds and fired in saggers in an oxidizing atmosphere to the temperatures indicates in the tabulation, such temperature being maintained for three hours.

Examples of Group I

| Composition | $BaTiO_3$ Wt. Percent | $SrTiO_3$ Wt. Percent | Firing Temp. | Dielectric Constant | |
|---|---|---|---|---|---|
| | | | | 1 kilo. | 1 mega. |
| | | | °F. | | |
| 1 | 5 | 95 | 2,400 | 270 | 270 |
| 2 | 25 | 75 | 2,400 | 338 | 334 |
| 3 | 40 | 60 | 2,400 | 486 | 505 |
| 4 | 50 | 50 | 2,400 | 706 | 733 |
| 5 | 65 | 35 | 2,400 | 3,300 | 3,700 |
| 6 | 70 | 30 | 2,400 | 2,680 | 3,140 |
| 7 | 80 | 20 | 2,300 | 1,700 | 1,440 |

Examples of Group II

| Composition | $BaTiO_3$ Wt. Percent | $SrTiO_3$ Wt. Percent | $Ba(OH)_2.8H_2O$ Wt. Percent | $Sr(OH)_2.8H_2O$ Wt. Percent | Dielectric Constant, 1 mega. |
|---|---|---|---|---|---|
| 8 | 45 | 45 | 10 | | 3,406 |
| 9 | 45 | 45 | | 10 | 2,920 |
| 10 | 45 | 45 | 5 | 5 | 3,150 |

The above bodies were all fired at 2400° F.

Examples of Group III

| Composition | $BaTiO_3$ Wt. Percent | $PbTiO_3$ Wt. Percent | Firing Temp. | Dielectric Constant | |
|---|---|---|---|---|---|
| | | | | 1 kilo. | 1 mega. |
| | | | °F. | | |
| 11 | 95 | 5 | 2,400 | 640 | 210 |
| 12 | 80 | 20 | 2,300 | 1,430 | 442 |
| 13 | 50 | 50 | 2,300 | 2,100 | 1,200 |
| 14 | 20 | 80 | 2,200 | 460 | 240 |

Examples of Group IV

| Composition | $BaTiO_3$ Wt. Percent | $PbTiO_3$ Wt. Percent | $Ba(OH)_2.8H_2O$ Wt. Percent | Dielectric Constant, 1 megacycle |
|---|---|---|---|---|
| 15 | 60 | 30 | 10 | 912 |

The above was fired at 2280° F.

Examples of Group V

| Composition | $SrTiO_3$ Wt. Percent | $PbTiO_3$ Wt. Percent | Firing Temp. | Dielectric Constant | |
|---|---|---|---|---|---|
| | | | | 1 kilo. | 1 mega. |
| | | | °F. | | |
| 16 | 95 | 5 | 2,350 | 310 | 220 |
| 17 | 90 | 10 | 2,350 | 323 | 280 |
| 18 | 85 | 15 | 2,350 | 320 | 300 |
| 19 | 80 | 20 | 2,350 | 340 | 310 |
| 20 | 75 | 25 | 2,300 | 600 | 560 |
| 21 | 60 | 40 | 2,150 | 790 | 804 |
| 22 | 50 | 50 | 2,150 | 895 | 910 |
| 23 | 40 | 60 | 2,100 | 742 | 740 |
| 24 | 30 | 70 | 2,100 | 560 | 510 |
| 25 | 20 | 80 | 2,100 | 295 | 280 |

Examples of Group VI

| Composition | $SrTiO_3$ Wt. Percent | $PbTiO_3$ Wt. Percent | $Sr(OH)_2.8H_2O$ Wt. Percent | Dielectric Constant, 1 megacycle |
|---|---|---|---|---|
| 26 | 50 | 40 | 10 | 1,190 |

The above was fired at 2275° F.

Examples of Group VII

| Composition | $SrTiO_3$ Wt. Percent | $BaTiO_3$ Wt. Percent | $PbTiO_3$ Wt. Percent | Firing Temp. | Dielectric Constant | |
|---|---|---|---|---|---|---|
| | | | | | 1 kilo. | 1 mega. |
| | | | | °F. | | |
| 27 | 80 | 15 | 5 | 2,400 | 320 | 320 |
| 28 | 80 | 10 | 10 | 2,400 | 440 | 390 |
| 29 | 70 | 15 | 15 | 2,250 | 370 | 302 |
| 30 | 70 | 25 | 5 | 2,300 | 393 | 380 |
| 31 | 60 | 35 | 5 | 2,300 | 520 | 508 |
| 32 | 50 | 45 | 5 | 2,260 | 908 | 840 |

The following is an example of the strontium titanate-lead titanate mixture with boron titanate added to avoid cracking in firing:

| Composition | $SrTiO_3$ Wt. Percent | $PbTiO_3$ Wt. Percent | $B_2TiO_5$ Wt. Percent | Dielectric Constant, 1 megacycle |
|---|---|---|---|---|
| 33 | 60 | 36 | 4 | 865 |

The above was fired at 2200° F.

In addition to the above a composition comprised of 85% by weight of $SrTiO_3$, 10% by weight of $PbTiO_3$ and 5% by weight of $La_2O_3$ was prepared and fired at 2350° F. This body exhibited a dielectric constant of 232 at a frequency of 1 megacycle.

It may be pointed out that peak dielectric constants are attained, in all of the various mixtures set forth in the foregoing examples, when the mixed titanates are present in a definite molecular ratio. In the case of the mixtures of Group I, for instance, the peak dielectric constant appears to be attained when the mixture contains about 72 parts of barium titanate and 28 parts of strontium titanate. This proportion is exactly equivalent to a molar ratio of 2 to 1. Again, in the case of the mixtures of Group V, the peak dielectric constant appears to be attained with a mixture of 83½ parts of strontium titanate to 16½ parts of lead titanate. This is almost exactly equivalent to a molar ratio of 9 to 1.

The extremely high dielectric constants of the ceramic bodies of the present invention open new fields in the electrical arts for the application of capacitive principles of coupling and energy transmission and transformation generally.

The high capacitance materials afforded makes possible capacitive coupling between, for instance, a high tension alternating current transmission line and a telephone line. The extremely high dielectric constants of these materials make it possible to substitute capacitors where resistance connections would otherwise be employed. Application of the materials disclosed herein in the fields of pyroelectricity and supersonics is indicated and its use in the construction of crystal or condenser microphones, frequency stabilizers, amplifiers, phonograph pickups and oscillators generally will be found highly advantageous. Some of the members of the foregoing groups exhibit the electrical and mechanical characteristics of piezoelectric and pyroelectric crystals.

The very high dielectric constant of these materials provides an effective substitute for clear block condenser mica as used in radio and communication work. These bodies may also be used as substitutes for paper and electrolytic condensers for use in filter and by-pass circuits. They may also be used as power factor control condensers for A. C. induction motors, as high voltage capacitors, in television, as starting devices for single phase motors, for elimination of sparking at contact points, and in analogous dielectric applications.

While specific examples of the dielectric material of the present invention are set forth by way of illustration, it is to be understood that the present invention is not to be considered limited thereto or otherwise than as defined in the appended claims.

What is claimed is:

1. The method of making a dielectric body comprising firing separately to vitrification titanates of barium and strontium, thoroughly mixing the fired titanates in powdered form, in the range of 5% to 95% of barium titanate and a complementary amount of strontium titanate, adding water, molding, and refiring to produce a unitary ceramic body.

2. A composition of matter which is suitable for dielectric purposes comprising substantially entirely a combination of the titanates of barium and strontium admixed with one another, the proportion by weight of one of said titanates in said composition being within the limits of 5% to 95%, the proportion of the associated titanate being complementary together with an appreciable amount up to 10 molal percent of oxide chosen from the group consisting of barium oxide, strontium oxide and mixtures thereof, said composition containing from 25 to 45 per cent by weight of titanium dioxide in chemical combination with titanate-forming oxide.

3. A composition of matter which is suitable for dielectric purposes comprising substantially entirely a combination of the titanates of barium and strontium in which the proportion of one of said titanates is within the limits of 5% and 95%, the proportion of the associated titanate being complementary, said combination containing from 35 to 40 per cent by weight of combined titanium dioxide, said composition also including an appreciable amount up to 10 molal per cent of the oxides of barium and strontium.

EUGENE WAINER.

REFERENCES CITED

The following references are of record in the file of this patent:

UNITED STATES PATENTS

| Number | Name | Date |
| --- | --- | --- |
| 2,071,452 | Bloch | Feb. 23, 1937 |
| 2,098,812 | Pulfrich | Nov. 9, 1937 |
| 2,165,819 | Albers-Schonberg | July 11, 1939 |
| 2,220,765 | Hirose et al. | Nov. 5, 1940 |
| 2,277,733 | Wainer et al. | Mar. 31, 1942 |
| 2,277,734 | Wainer et al. | Mar. 31, 1942 |
| 2,305,327 | Thurmauer | Dec. 15, 1942 |
| 2,420,692 | Wainer | May 20, 1947 |